United States Patent [19]

Huang et al.

[11] Patent Number: 5,467,146
[45] Date of Patent: Nov. 14, 1995

[54] ILLUMINATION CONTROL UNIT FOR DISPLAY SYSTEM WITH SPATIAL LIGHT MODULATOR

[75] Inventors: Austin L. Huang, Dallas; James M. Florence, Richardson, both of Tex.

[73] Assignee: Texas Instruments Incorporated, Dallas, Tex.

[21] Appl. No.: 221,739

[22] Filed: Mar. 31, 1994

[51] Int. Cl.⁶ .................................... H04N 9/30
[52] U.S. Cl. ..................... 348/743; 348/771; 348/746
[58] Field of Search ...................... 359/227, 223, 359/224; 348/739, 740, 742, 743, 744, 750, 751, 755, 759, 760, 770, 264, 340, 362, 367

[56] References Cited

U.S. PATENT DOCUMENTS 3,412,386  10/1989  Gorog et al. ..................... 348/764
4,495,492  1/1985  Anderson et al. ................. 348/739 X
5,172,221  12/1992  Ko .................................... 348/742 X Primary Examiner—Victor R. Kostak
Assistant Examiner—Nathan J. Flynn
Attorney, Agent, or Firm—Julie L. Reed; Richard L. Donaldson; Rene E. Grossman

[57] ABSTRACT

An illumination control unit (17) for a projection display system (10) that uses a digital mirror device (DMD) (15) to generate images. The illumination control unit (17) has a first set of lenses (23) for receiving light from a source and focussing the light to a color filter (24). A second set of lenses (25) receives the colored light and directs it to a prism (28). The prism (28) bends the light toward the reflective mirrors (30) of the DMD (15), and a collimating lens (28a) provides a beam that is approximately the size of the mirror array of the DMD (15). An optical shutter (26) is interposed between the second set of lenses (25) and the prism (28a), and permits the system (10) to achieve a "black state" between image displays or to achieve modulated brightness levels of images being displayed.

11 Claims, 1 Drawing Sheet

ILLUMINATION CONTROL UNIT FOR DISPLAY SYSTEM WITH SPATIAL LIGHT MODULATOR

TECHNICAL FIELD OF THE INVENTION

This invention relates to image display systems, and more particularly, to a display system that uses a spatial light modulator.

BACKGROUND OF THE INVENTION

Real-time display systems based on spatial light modulators (SLMs) are increasingly being used as an alternative to display systems using cathode ray tubes (CRTs). SLM systems provide high resolution displays without requiring the digital data to be converted to analog form prior to display as is the case with a CRT system.

Digital micro-mirror devices (DMDs) are a type of SLM, and may be used in projection display applications. A DMD has an array of micro-mechanical mirror elements, each mounted above a memory cell. Each mirror is individually addressable by electronic data. Depending on the state of its addressing signal, each mirror is tilted so that it either does or does not reflect light on or off an optical axis toward a display screen. The proportion of time during each video frame that a mirror is in an on state determines shades of gray—from full black for zero on-time to full white for 100 percent on-time.

One type of DMD display system is a projection system. Light from the "on" mirrors passes through a projection lens and creates images on a large screen. Light from the "off" mirrors is reflected away from the projection lens and trapped. Color may be added in either of two ways, by a color wheel or by a three-DMD configuration in which each DMD images a red, green, or blue light component onto the screen.

During operation, it is sometimes desirable to have completely black image. However, in existing systems, even when all of the DMD's mirror elements are in an off state, some light continues to reach the entrance aperture of the projection lens.

SUMMARY OF THE INVENTION

One aspect of the invention is an illumination control unit for an image display system that uses a digital micro-mirror device (DMD) having an array of moveable mirror elements, which generates images according to a tilted "on" or "off" state of each mirror element. The system also uses a color wheel to filter the light incident on the mirror elements. A first set of lenses receives light from a source and focuses the light through the color wheel. A second set of lenses receives light from the color wheel and focuses on a face of a prism which bends the light to the face of the DMD. A collimating lens at this prism face provides a collimated beam that is approximately the size of the mirror element array. An optical shutter is interposed between the second set of lenses and the prism, and is turned on or off to determine whether the light is transmitted to the prism. A suitable optical shutter is comprised of liquid crystal elements that either transmit or block light according to an applied voltage.

A technical advantage of the invention is that is improves the "all off" black state of a DMD-based display system. A light shutter in accordance with the invention can be placed in the optical path to reduce the light intensity to less than 1% of the incident light. The result is a darker projected "black" screen when all mirror elements of the DMD are off. This darker state yields a higher contrast ratio and also masks white defective mirror elements during the "all off" state.

DETAILED DESCRIPTION OF THE INVENTION

A comprehensive description of a DMD-based digital display system is set out in U.S. Pat. No. 5,079,544, entitled "Standard Independent Digitized Video System", and in U.S. patent Ser. No. 08/147,249, entitled "Digital Television System" and in U.S patent Ser. No. 08/146,385, entitled "DMD Display System", Each of these patents and patent applications is assigned to Texas Instruments Incorporated, and each is incorporated by reference herein.

U.S. Pat. No. 5,278,652, entitled "DMD Architecture and Timing for Use in a Pulse-Width Modulated Display System", describes a method a formatting video data for use with a DMD-based display system and a method of modulating bit-planes of data to provide varying pixel brightness. The general use of a DMD-based display system with a color wheel to provide sequential color images is described in U.S. Pat. No. 5,233,385, entitled "White Light Enhanced Color Field Sequential Projection". These patent applications are assigned to Texas Instruments Incorporated, and are incorporated herein by reference.

Figure 1:
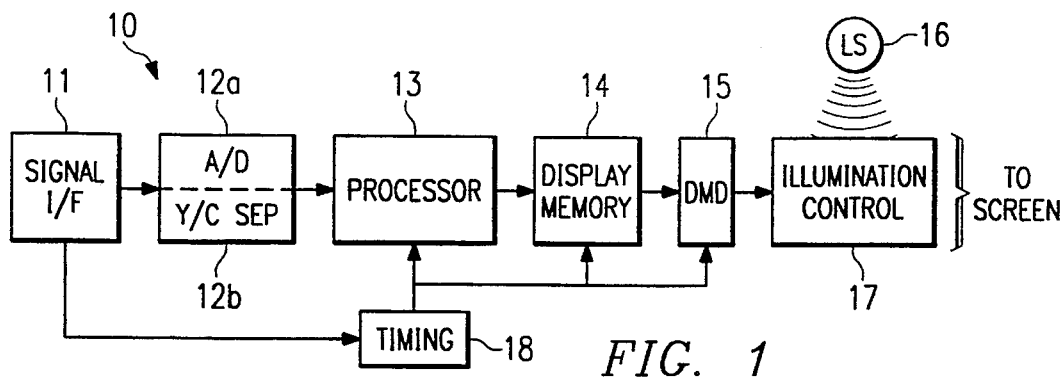
FIG. 1 illustrates a display system that uses a digital micro-mirror device (DMD) to holographic images, and a shuttered lens system in accordance with the invention to provide light to the DMD.

FIG. 1 illustrates a projection display system 10, which uses a digital micro-mirror device (DMD) 15 to generate real time images. Display 10 has an illumination control unit 17 in accordance with the invention, which provides a "black frame" state. Only those components significant to main-screen pixel data processing are shown. Other components, such as might be used for processing synchronization and audio signals or secondary screen features, such as closed captioning, are not shown. The nature of the input signal is not important to the invention; although the system of this description is in terms of an analog television input signal, the input signal could also be digital.

As an overview of the operation of display system 10, signal interface unit 11 receives an analog video signal and separates video, synchronization, and audio signals. It delivers the video signal to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion, using analog filters.

Processor system 13 prepares the data for display, by performing various pixel data processing tasks. Processor system 13 includes whatever processing memory is appropriate for storing pixel data during processing, such as field and line buffers. The tasks performed by processor system 14 include linearization, colorspace conversion, and line generation. The order in which these tasks are performed may vary.

Display memory 14 receives processed pixel data from processor system 13. Display memory 14 formats the data, on input or on output, into "bit-plane" format, and delivers the bit-planes to DMD 15 one at a time. The bit-plane format permits each pixel element of DMD 15 to be turned on or off in response to the value of 1 bit of data at a time. In a typical display system 10, display memory 14 is a "double buffer" memory, which means that it has a capacity for at least two display frames. The buffer for one display frame can be read out to DMD 15 while the buffer for another display frame is being written. The two buffers are controlled in a "ping-pong" manner so that data is continuously available to DMD 15.

The data from display memory 14 is delivered to DMD 15, which uses the data from display memory 14 to address mirror elements. The "on" or "off" state of each mirror element forms each image. DMD 15 and its operation are further described below in connection with FIG. 3.

Light incident on the surface of DMD 15 is provided by a light source 16. Illumination control unit 17 receives this light, and as explained below in connection with FIG. 2, has optical components for directing the light to DMD 15. For color displays, the bit-planes for each color could be sequenced and synchronized to a color wheel that is part of optics unit 17. Or, the data for different colors could be concurrently displayed on three DMDs, such that each DMD 15 has its own optics unit 17 for providing light of a different color. Illumination control unit 17 also has means for projecting the light reflected from DMD 15 as images to a display surface such as a screen. Master timing unit 18 provides various system control functions.

Figure 2:
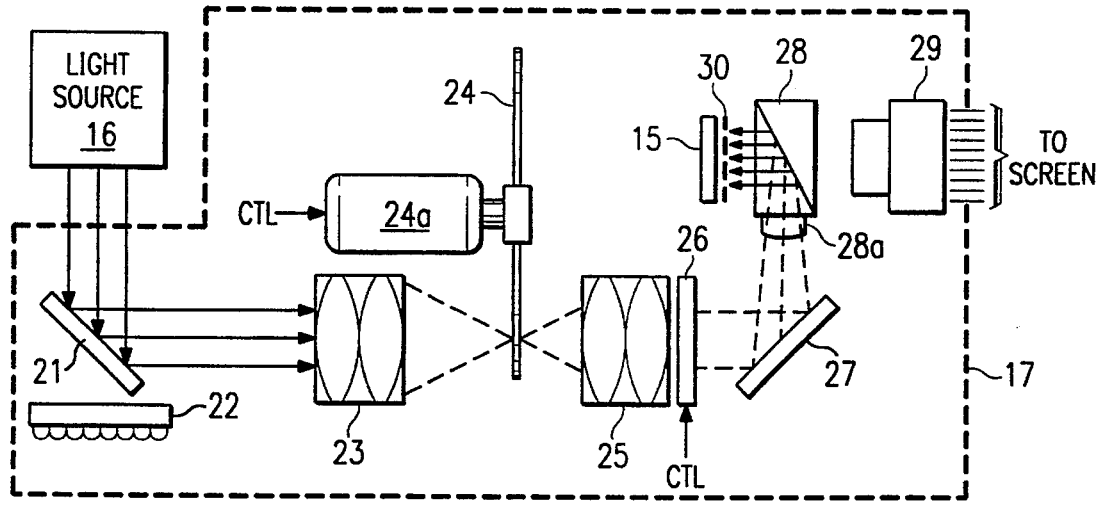
FIG. 2 illustrates the DMD, light source, and display optics unit of FIG. 1 in further detail.

FIG. 2 illustrates DMD 15, light source 16, and illumination control unit 17 in further detail. Illumination control unit 17 has a rotating color filter 24, for systems that provide color images with a single DMD 15. The color filter 24 is synchronized to the images on DMD 15 such that successive color fields for each color occur during each 16.7 millisecond frame. However, as stated above, another approach to providing color images is to use a different DMD 15 for each color, which eliminates the need for a color wheel. With this multiple DMD approach, color filter 24 might be stationary.

Light source 16 provides white light, which after being filtered by color filter 24 is eventually reflected from the surface of the DMD 15. An example of a suitable light source 16 is a 1000 watt, xenon arc source.

Illumination control unit 17 is comprised of a first mirror 21 for directing a beam of light from source 16 to a first set of lenses 23. A heat sink 22 captures heat.

A first set of lenses 23 focuses the light through color filter 24, which rotates by means of a motor 24a. After being filtered by color filter 24, the light is received into a second set of lenses 25 and quasi-collimated to approximately the size of the mirror element array of DMD 15.

An optical shutter 26 is in the path of this quasi-collimated light. Optical shutter 26 is a liquid crystal device, in which a liquid crystal layer is sandwiched between glass supports. Using principles known in the art of liquid crystal displays and in optical switching, a voltage is applied to cause the molecules in the liquid crystal layer to align. Light may then pass from one side of shutter 26 to the other.

Optical shutter 26 is "off" when the applied voltage does not permit light to be transmitted through it. Optical shutter 26 is "on" when light is transmitted.

For providing an "all black" frame, optical shutter 26 is "off" and prevents light from reaching DMD 15. In this aspect of the invention, the on-off states of optical shutter 26 is determined on a frame-by-frame basis, and correspond to the length of a frame. For example, for NTSC television displays, the frame period is 16.7 milliseconds for a 60 frame per second display rate.

For displaying images, optical shutter 26 permits light to reach DMD 15 and the image is formed in accordance with the addressed states of the mirror elements. More specifically, when optical shutter 26 is "on", a second mirror 27 directs light to a prism 28, which bends the light toward the reflective surface of the DMD 15. A collimating lens 28a at the face of prism 28 provides a collimated beam that is approximately the area of the mirror element array. For illustrative purposes, several mirror elements 30 are illustrated. However, in practical application, DMD 15 would have an array of hundreds or thousands of such mirror elements 30. A projection lens 29 receives the light reflected from DMD 15, re-focuses the image to a size appropriate for the screen size and distance, and directs it to a surface such as a screen, as a displayed image.

The on and off states of optical shutter 26 are controlled by a CTL input. For all-black frames, the CTL signal turns the shutter off for the desired number of frame periods. Typically, the rotations of color filter 24 are related to frame rates, which permits the CTL signal to shutter 26 to be linked to the CTL signal to color wheel motor 24a. Master timing unit 18 provides the control and timing for the CTL signal.

Another aspect of the invention, in addition to providing all-black frames, is the use of optical shutter 26 to provide levels of brightness during image displays. For example, if shutter 26 is "off" for one-half of a frame period, the resulting image will be 50% as bright. The determination of a level of brightness could be user-controlled or automatic, with some sort of input to timing unit 18, which provides an appropriate CTL signal to shutter 26. Many different techniques could be used for modulating the on-off times of shutter 26. For example, for a 50% brightness level, each frame period could be divided into four time slices, i.e., one on, one off, one on, one off. A typical optical shutter 26 has a switching time in the order of 1 millisecond, thus, as many as 16 brightness levels are possible.

In FIG. 2, mirrors 21 and 27 re-direct the light in a path dictated by the placement of source 16, color filter 24, and DMD 15. For other configurations, different mirrors could be used, and the light path of illumination control unit 17 might dictate the use of more or fewer mirrors, or mirrors in different locations with respect to other components of illumination control unit 17. Regardless, a characteristic of the overall light path is that the light incident on the surface of DMD 15 be at a desired angle, predetermined by the tilt angle of the mirror elements 30.

Figure 3:
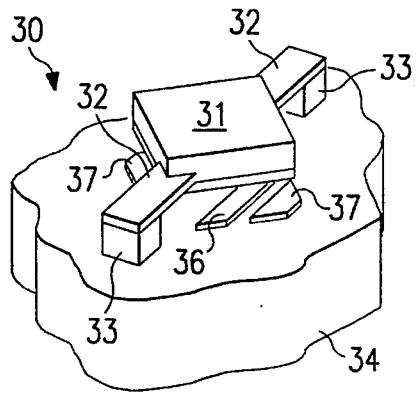
FIG. 3 illustrates a single mirror element of the DMD.

FIG. 3 illustrates a single mirror element 30 of DMD 15. A typical display image might be comprised of pixels, each corresponding to one mirror element 30 of an array having 768 mirror elements per row and 576 rows. When light from source 16 is incident on the surface of the mirror elements 30, each mirror element 30 provides one pixel of an image.

Referring to both FIGS. 2 and 3, illumination control unit 17 either provides illumination to the surface of DMD 15 or prevents light from reaching DMD 15, as determined by shutter 26. Each mirror element 30 has a tilting mirror 31 supported by torsion hinges 32 attached to support posts 33. The mirrors 31 are positioned over an address/memory circuit 34, which is fabricated on a silicon substrate. Electrostatic forces based on the data in the memory cells of address/memory circuit 34 tilt each mirror 31 either +10 degrees (on) or −10 degrees (off), thereby modulating the light incident on the surface of the DMD 15. Light reflected from the "on" mirrors 31 passes through projection lens 29 and creates images on an image plane. Light from the off mirrors is reflected away from projection lens 29.

Referring now especially to FIG. 3, directly over each memory cell 34, are two address electrodes 36 and two landing electrodes 37. The mirror 31 has three states. It operates in a bistable mode, tilting 10 degrees about the hinges 32 in one or the other direction. The third state is a flat position to which the mirrors 31 return when the display is not in operation.

In effect, the mirror 31 and the address electrodes 36 form capacitors. When +5 volts (digital 1) is applied to one address electrode 36, 0 volts (digital 0) is applied to the other address electrode 36, and a negative bias to the mirror 31, the electrostatic charge thus created causes mirror 31 to tilt toward the +5 volt electrode 36. The voltage on the address electrode 36 starts the mirror 31 tilting, whereupon it continues under its own momentum until it hits the landing electrode 37.

Once a mirror 31 tilts in either direction, it remains electro-mechanically latched in that state. Merely changing the states of the address electrodes 36 will not cause the mirror to move; it is removal of the bias on each mirror 31 that causes it to return to its untilted position. When the bias is reapplied, the mirrors 31 tilt in accordance with their new address states.

The mirror element 30 of FIG. 3 has a "torsion beam" design. However, the invention is useful with other DMD designs. For example, in a cantilever design, a mirror is supported at one end by a hinge and its free end tilts down toward its address electrodes. Further details of various types of DMDs are set out in U.S. Pat. No. 5,083,857, entitled "Multi-Level Deformable Mirror Device" in U.S Pat. No. 5,061,049, entitled "Spatial Light Modulator and Method" and in U.S. Pat. No. 4,956,619, entitled "Spatial Light Modulator". Each of these is assigned to Texas Instruments Incorporated, and each is incorporated by reference herein.

Figure 4:
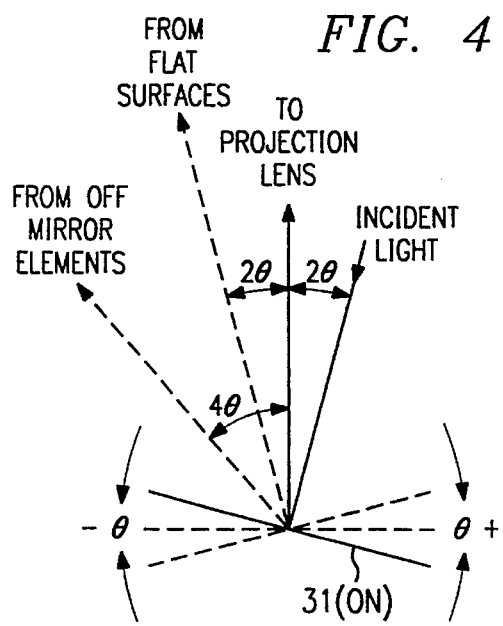
FIG. 4 illustrates the relationship of the angle of light incident on the DMD to the DMD's operation.

FIG. 4 illustrates the relationship of the angle of light incident on DMD 15 and its operation. For mirror elements that tilt 10 degrees one way and 10 degrees the other way, the incident light is directed at an angle approximately 20 degrees relative to an axis perpendicular to the reflective surface. Mirrors tilted 10 degrees on will reflect the incoming light by a −20 degree angle through lens 29. Mirrors tilted −10 degrees (off) will reflect the path of the incident light by −60 degrees so as the miss the aperture of projection lens 29. Likewise, flat surfaces on the array, such as the surface of hinges 32, will re-direct the incident light by −40 degrees, so that it misses the aperture of projection lens 29.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An illumination control unit for an image display system, which uses a digital micro-mirror device (DMD) that has an array of mirror elements and that generate images according to a tilted or untilted state of each mirror elements, comprising:

a first set of lenses for receiving light from a source and directing said light through a color filter;

a color filter for filtering said light in one or more colors;

a second set of lenses for receiving said light from said color filter and for focusing said light to a prism;

a prism for receiving said light from said second set of lenses and for bending said light toward the reflective surfaces of said mirror elements;

a collimating at a face of said prism lens for providing a substantially collimated beam that is approximately the same area as said array;

a shutter interposed between said first set of lenses and said prism, for determining whether said light shall be transmitted to said prism; and a projection lens for receiving light reflected from said mirror elements and for projecting images formed by said light to a display surface.

2. The illumination control unit of claim 1, wherein said shutter is a liquid crystal device.

3. The illumination control unit of claim 1, further comprising at least one mirror for re-directing said light along a desired optical path.

4. The illumination control unit of claim 1, wherein said color filter is a rotating color wheel.

5. The illumination control unit of claim 4, wherein said shutter and said color wheel are synchronized by a common control signal.

6. The illumination control unit of claim 1, wherein said shutter is interposed between said second set of lenses and said prism.

7. A method of controlling the illumination incident to a digital micro-mirror device (DMD) that has an array of mirror elements and that generate images according to a tilted or untilted state of each mirror elements, comprising the steps of:

generating a beam of light;

using a first set of lenses to focus said beam through a color filter;

using a second set of lenses to receive the filtered light and to focus said filtered light to a prism;

using a prism to direct the light to a desired incident angle to the surface of said array;

using a collimated lens to provide the light in a substantially collimated beams that is approximately the size of said array to said prism; and using an optical shutter to control whether said collimated beam is transmitted to said prism.

8. The method of claim 7, wherein said step of using an optical shutter is performed in accordance with frame periods.

9. The method of claim 7, wherein said step of using an optical shutter is performed in accordance with time slices less than one frame period.

10. The method of claim 7, wherein said color filter is a rotating color wheel and wherein said step of using an optical shutter is synchronized to rotations of said color wheel.

11. The method of claim 7, further comprising the step of projecting light reflected from said mirror elements as an image to a display surface.

* * * * *